United States Patent [19]
Shouse, Jr.

[11] Patent Number: 5,496,083
[45] Date of Patent: Mar. 5, 1996

[54] SYSTEM FOR INSTALLING AUTOMOBILE BABY SEATS

[76] Inventor: William E. Shouse, Jr., 831 W. Philadelphia, Unit A, Ontario, Calif. 91762

[21] Appl. No.: 316,901

[22] Filed: Oct. 3, 1994

[51] Int. Cl.$^6$ .............................. B25B 27/14; B25J 1/00
[52] U.S. Cl. .................. 294/1.1; 29/278; 81/487; 294/19.1; 294/99.1
[58] Field of Search ....................... 294/1.1, 19.1, 294/24, 99.1; 24/530, 535, 545, 563; 29/270, 278; 81/487, 488; 254/134.3 R, 134.3 FT

[56] References Cited

U.S. PATENT DOCUMENTS

| | | | |
|---|---|---|---|
| 3,206,844 | 9/1965 | Bowden | 29/278 |
| 3,424,038 | 1/1969 | Smith | 81/487 |
| 4,890,345 | 1/1990 | Sessa | 294/19.1 X |
| 5,197,176 | 3/1993 | Reese | 294/1.1 X |

Primary Examiner—Johnny D. Cherry
Attorney, Agent, or Firm—Elliott N. Kramsky

[57] ABSTRACT

A system for installing a baby seat, of the type that includes a transverse channel within a base, in an automobile. A clip that includes a bell spring with arms bonded to planar pads permits the installer to maintain the extended position of the automobile seat belt against retraction. An elongated member includes a handle and a clip at its opposed ends. The elongated member and the clip in combination exceed the length of the transverse channel, permitting the installer to insert the elongated member into the channel. The clip is thereby readily accessible to the engagement plate at the end of the seat belt at the same time that the handle can be grasped from the other side of the baby seat. This permits the installer to thread the baby seat through the transverse channel for subsequent engagement to a mating seat belt buckle.

8 Claims, 2 Drawing Sheets

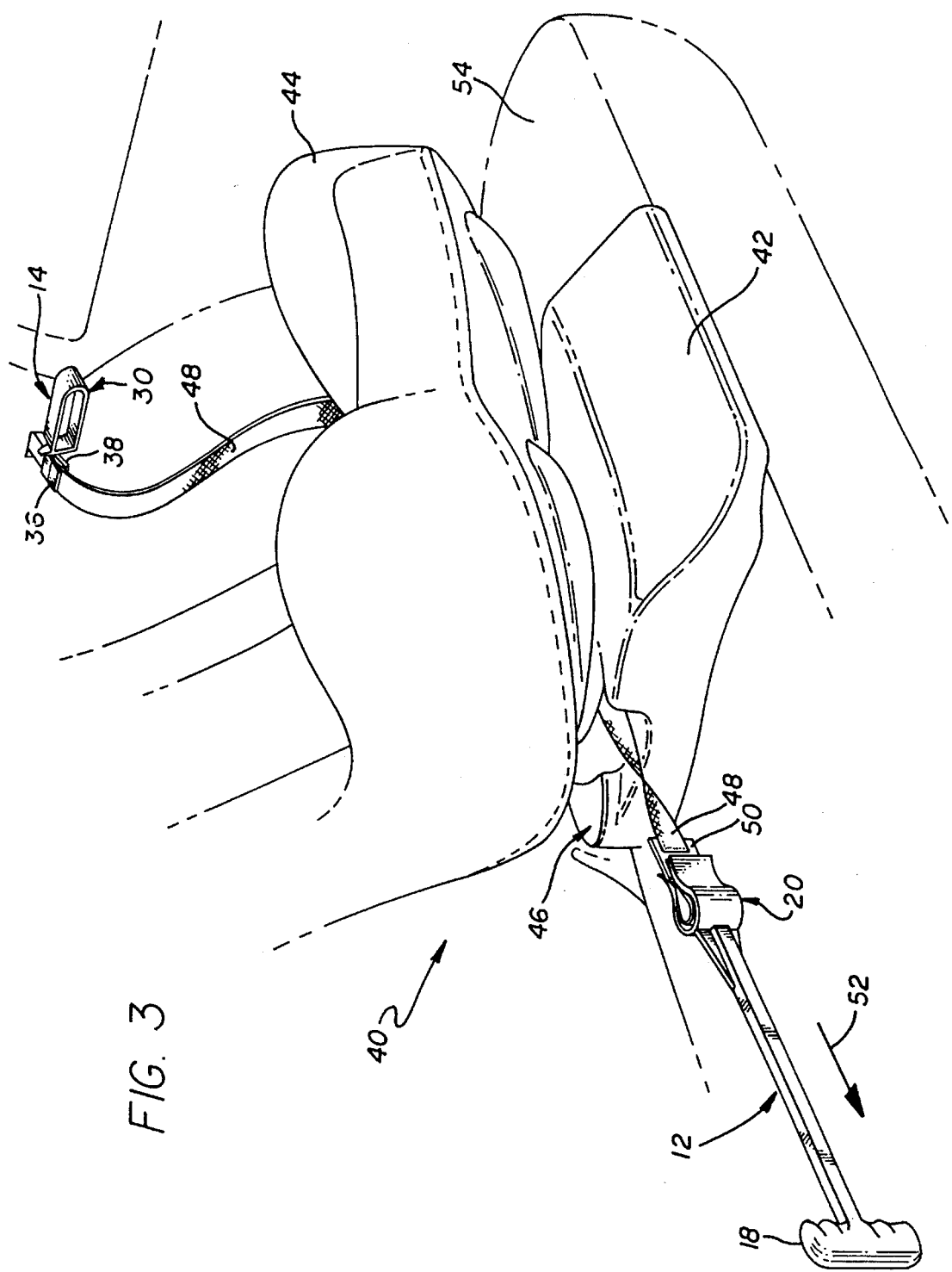

5,496,083

SYSTEM FOR INSTALLING AUTOMOBILE BABY SEATS

BACKGROUND

1. Field of the Invention

The present invention relates to automobile baby seats. More particularly, this invention pertains to apparatus for facilitating installation of a baby seat of a particular type in an automobile.

2. Description of the Prior Art

A common design for an automobile baby seat includes a base having a transverse channel for receiving an automobile seat belt of the lap or shoulder type in a tie-down arrangement. After passing through the channel, the seat belt, which terminates in a metal engagement plate, is then coupled to a mating buckle.

Automobile seat belts are commonly of fabric or synthetic material, terminating, as mentioned earlier, in a metal plate designed to interlock with a buckle. The buckle may be located either at the end of a strip of fabric or synthetic material or fixed directly to the automobile itself. In either case, the near-universal presence of a seat belt provides a logical invitation to design baby seats upon the assumption that the automobile seat belt will act as fastener.

Often, the seat belt is engaged to a spring-driven retraction mechanism. Such a mechanism applies constant tension taking up unneeded length and retracting the belt completely when unused. Such a conventional seat belt arrangement complicates the installation of a baby seat. The transverse channel at the seat base is generally of inadequate size to allow an adult to insert his or her forearm and hand to a sufficient depth to grasp the end of the belt to thread it through the transverse channel. This necessary process is further complicated by the above-described retraction mechanism, making the installation of such a baby seat an often vexing task that can cause physical harm to an installer forced to assume awkward and inconsistent positions during attachment. Muscle strains and even spinal and back injuries are unfortunately not uncommon.

SUMMARY OF THE INVENTION

The present invention addresses the foregoing problems of the prior art by providing apparatus for use in securing a baby seat of the type that includes a transverse channel in an automobile by means of a retractable seat belt. Such apparatus includes means for preventing retraction of the seat belt. Means are additionally provided for guiding the seat belt through the channel.

The preceding and other features and advantages of this invention will become further apparent from the detailed description that follows. Such detailed description is accompanied by a set of drawing figures. Numerals of the drawing figures, corresponding to those of the written description, point to the various features of the invention. Like numerals refer to like features throughout both the written description and the drawing figures.

BRIEF DESCRIPTION OF THE DRAWINGS

FIG. 3 is a perspective view of the invention in use for securing a baby seat to the rear seat of an automobile.

DETAILED DESCRIPTION OF THE PREFERRED EMBODIMENT

Figure 1:
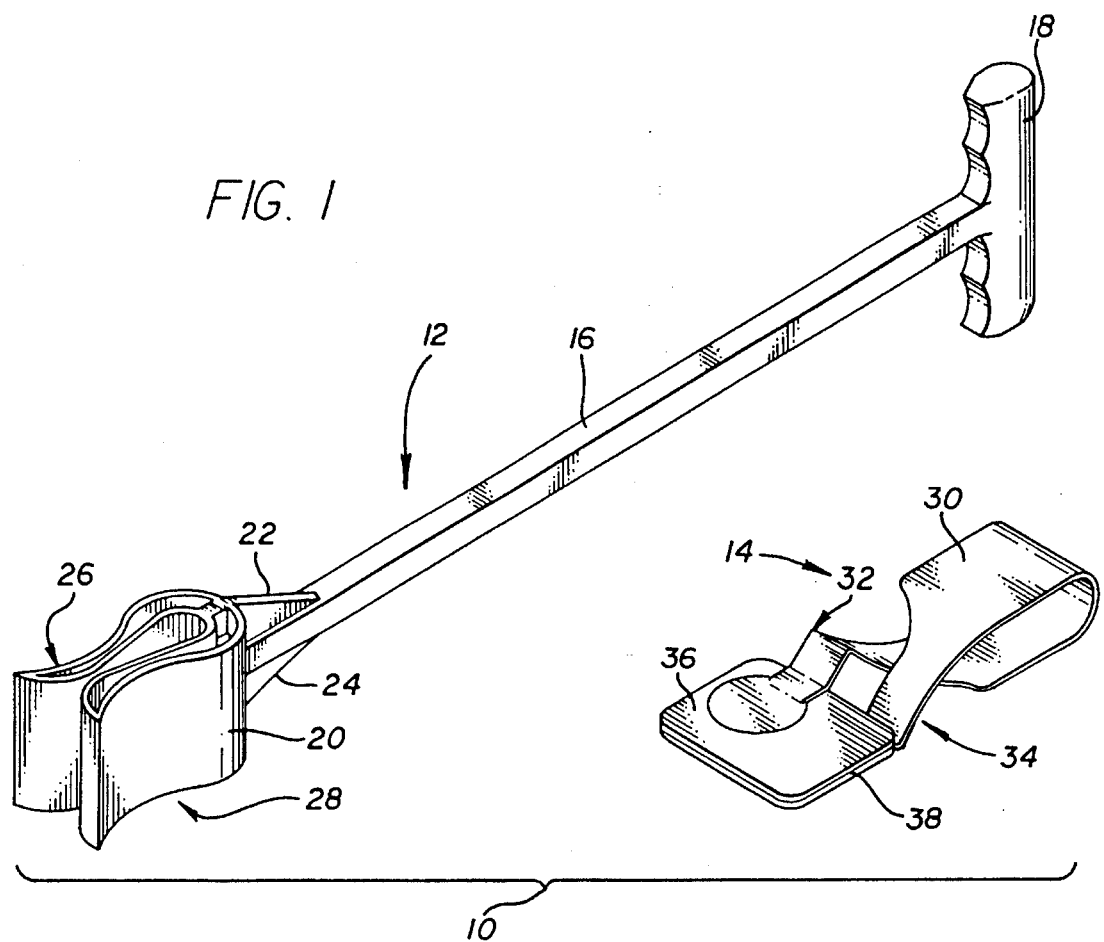
FIG. 1 is a perspective view of the invention which includes an elongated member and a seat belt clamp.

FIG. 1 is a perspective view of the baby seat installation system 10 of the invention which includes an elongated member 12 and a seat belt clamp 14. The elongated member 12, preferably of an appropriate molded plastic composition, includes a central extender 16 that is bounded at opposed ends by a handle 18 and a clip member 20. Flanges 22 and 24 on opposed sides of the extender 16 reinforce the junction of the clip 20 to the extender 16.

The elongated member 12 is formed of a strong and resilient plastic material so that the leaves 26 and 28 thereof, when parted to receive the engagement plate of a seat belt, as shown below, will exert sufficient inwardly-acting pressure to hold the belt as it is pulled or threaded through the transverse channel of a baby seat.

The clip 14 is provided for securing the automobile seat belt against retraction. It comprises a spring 30 of appropriate resilient material (preferably metallic). The spring 30 is attached to a pair of spring arms 32 and 34 whose ends are bonded to planar pads 36 and 38 respectively. The pads 36 and 38 may be separated from one another by manual compression of the spring 30. Upon separation, the clip 14 is employed, as shown below, to prevent retraction of the automobile seat belt and/or tension that would otherwise frustrate the threading of the belt through the transverse channel at the base of the baby seat.

Figure 2:
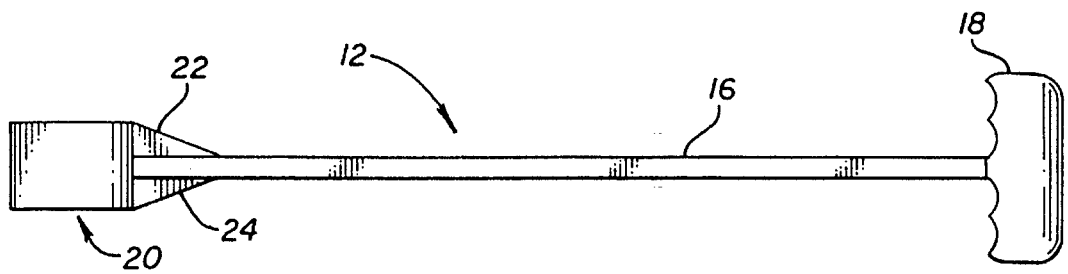
FIG. 2 is a side elevation view of the elongated member of the invention.

FIG. 2 is a side elevation view of the elongated member 12. As can be seen, the length of the elongated member 12 is substantially due to that of the relatively-thin central extender 16. It is a feature of the present invention that the length of the extender 16, in combination with that of the clip 20, exceeds the length of the transverse channel at the base of the baby seat. This allows the user to insert the elongated member 12 into the transverse channel from one side of the baby seat and to then grasp the engagement plate of the seat belt at the opposite end of the transverse channel with the clip 20.

FIG. 3 is a perspective view of the system of the invention in operation. As described above, a baby seat 40 includes a base member 42 for supporting a baby chair 44. A transverse channel 46 is provided within the base 42 beneath the chair 44 for receiving an automobile seat belt.

As described above, the channel 46 is, in many existing commercial designs, of insufficient size to sufficiently accommodate the hand and forearm of an adult. This leads to serious difficulties and inconveniences during installation. The present invention overcomes such difficulties by providing a convenient means for threading the seat belt 48 through the channel 46.

The situation illustrated in FIG. 3 represents the resultant configuration after the seat belt 48 has been threaded through the channel 46. Initially, the belt 48 is manually extended and secured from retraction and rendered tension-free by manually applying the clamp 14 adjacent an end thereof as shown. As mentioned earlier, the pads 36 and 38 of the clip 14 may be opened by manually compressing the spring 30 of the clip 14. Thereafter, such pressure is removed, permitting the pads 36 and 38 to be returned to the "default" position shown in FIG. 1 for securing the belt as shown in FIG. 3.

It has already been mentioned that the length of the extender 16, in combination with the clip 20, is sufficient so that the handle 18 may extend from one end of the transverse channel 46 at the same time that the clip 20 protrudes from the other end. This allows the clip 20 access to the engagement plate 50 fixed to the end of the seat belt 48. Thereafter, the elongated member is pulled through the channel 46 in the direction indicated by the arrow 52 and the seat belt 48 correspondingly dragged or threaded through the baby seat as shown in FIG. 3. The elongated member 12 may now be pulled away from the engagement member 50 of the seat belt 48 and inserted into a seat belt buckle (not shown) to complete attachment of the baby seat 40 to the seat 54 of the automobile.

Thus, it is seen that the present invention provides apparatus for facilitating the process of securing a baby seat of the type that includes a transverse channel to an automobile. Such apparatus is especially useful when used with a retractable seat belt. By applying the teachings of the invention, one may readily install a baby seat of such type without performing the uncomfortable gymnastics otherwise dictated. Awkward positions assumed for the purpose of, for example, simultaneously holding one end of a belt against retraction while possibly tilting the baby seat can result in a wide range of injuries, including often—serious back injuries. Thus, the present invention not only represents a convenience, it also offers physical safety to the installer. In addition, the installer is often required to leave the baby temporarily unattended. Accordingly, a rapid and reliable installation process is quite desirable.

While this invention has been described with reference to its presently preferred embodiment, it is not limited thereto. Rather, this invention is limited only insofar as it is defined by the following set of patent claims and includes within its scope all equivalents thereof.

What is claimed is:

1. Apparatus for use in securing a baby seat of the type that includes a transverse channel in an automobile by means of a seat belt comprising, in combination:
   a) means for preventing retraction of said seat belt; and
   b) means for guiding said seat belt through said channel.

2. Apparatus as defined in claim 1 further characterized in that said means for guiding further includes means for grasping the free end of said seat belt.

3. Apparatus as defined in claim 2 wherein said means for guiding comprises an elongated member.

4. Apparatus as defined in claim 3 wherein said elongated member further comprises:
   a) a central extender;
   b) said means for grasping being located at a first end of said extender; and
   c) a handle being located at the opposed end of said extender.

5. Apparatus as defined in claim 4 wherein said means for grasping comprises a clip.

6. Apparatus as defined in claim 5 wherein the combined axial lengths of said extender and said clip exceeds the length of said transverse channel.

7. Apparatus as defined in claim 1 wherein said means for preventing retraction comprises a clip.

8. Apparatus as defined in claim 7 wherein said clip additionally comprises:
   a) a spring;
   b) said spring including a pair of spring arms; and
   c) each of said spring arms terminating in a planar pad.

* * * * *